United States Patent [19]

Hoy et al.

[11] Patent Number: 4,906,723

[45] Date of Patent: Mar. 6, 1990

[54] AMINOPOLYOL STABILIZERS

[75] Inventors: Kenneth L. Hoy, St. Albans, W. Va.; Glenn A. Taylor, Allentown, Pa.; Chinsoo Lee, Charleston, W. Va.

[73] Assignee: Union Carbide Chemicals and Plastics Company Inc., Danbury, Conn.

[21] Appl. No.: 276,747

[22] Filed: Nov. 28, 1988

[51] Int. Cl.[4] .............................................. C08G 18/28
[52] U.S. Cl. ..................................... 528/49; 524/722; 524/724; 524/755; 524/759; 524/760; 524/761; 524/762; 528/76; 528/77; 528/78; 528/80; 528/81; 528/82
[58] Field of Search ............... 524/722, 724, 755, 759, 524/760, 761, 762; 528/49, 82, 81, 77, 80, 78, 76

[56] References Cited

U.S. PATENT DOCUMENTS

| | | | |
|---|---|---|---|
| 2,629,740 | 2/1953 | Carnes | 260/584 |
| 3,325,421 | 6/1967 | Muller | 252/308 |
| 4,032,686 | 6/1977 | Emmons | 428/425 |
| 4,089,835 | 5/1978 | Konig et al. | 260/31.6 |
| 4,093,569 | 6/1978 | Reischel et al. | 260/2.5 |
| 4,286,074 | 8/1981 | Davis et al. | 521/137 |
| 4,581,470 | 4/1986 | Hoy et al. | 560/189 |
| 4,659,772 | 4/1987 | Hoy et al. | 524/755 |
| 4,727,094 | 2/1988 | Hoy et al. | 521/164 |

*Primary Examiner*—Maurice J. Welsh
*Assistant Examiner*—Rabon Sergent
*Attorney, Agent, or Firm*—Bonnie L. Deppenbrock

[57] ABSTRACT

A method is described for producing dispersions of polyurea and the like in polyols of increased stability by polymerizing an amine and an isocyanate in the presence of an aminoalcohol, typically an aminopolyol, having the following formula:

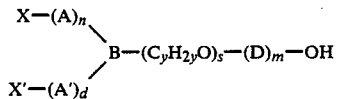

wherein A and A' are individually connective atoms which may be same or different, and are selected from the group consisting of carbon and oxygen or combinations thereof with hydrogen atoms or the like satisfying the valences; B is a member selected from the group consisting of nitrogen, NR, R being alkyl or aryl, or CR', R' being hydrogen, alkyl or aryl; D is a member selected from the group consisting of

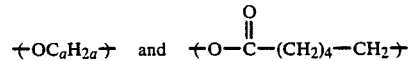

wherein a has a value of one to four; X is a member selected from the group consisting of OH, $NH_2$ or H; X' is a member selected from the group consisting of H or NHR' where R' is hydrogen, alkyl or aryl; n and d are individually integers of 0 to 10 and the sum of n and d is at least one and does not exceed 10; s is either 0 or 1; y is an integer of 0 to 4; and m is an integer of at least about 16, with the proviso that when B is nitrogen and either n or d is zero, X and X' are not both H. The dispersions are useful for the production of polyurethane foams.

18 Claims, No Drawings

AMINOPOLYOL STABILIZERS

FIELD OF THE INVENTION

The present invention relates generally to the use of aminopolyols as stabilizers for preparing stable dispersions of polyureas and the like in polyols.

BACKGROUND OF THE INVENTION

A number of methods are known for the preparation of polymer-polyol dispersions and, more specifically, for the preparation of dispersions of polyureas and the like in polyols. The stability of such dispersions is generally reflected in small particle size and low tendency for phase separation. Various steps have been taken over the years to improve the stability of such dispersions.

U.S. Pat. No. 3,325,421 to Muller describes a method for the preparation of a polyurea dispersion in a solvent such as a polyol. This involves the reaction between an organic isocyanate and a primary or secondary diamine, hydrazine or difunctional hydrazide in the polyol as the reaction medium. U.S. Pat. No. 4,093,569 to Reischi et al. describes the preparation of such polyurea dispersions using substantial quantities of water, particularly to provide high solids content dispersions. The quantity of water present is stated to be of decisive importance in determining the particle size, the particle size distribution and final viscosity of the dispersion. U.S. Pat. No. 4,089,835 to Konig et al. describes preparing this type of product using a continuous high-performance flow mixer so as to provide nonsedimenting dispersions of polyureas and pol-yhydrazo-dicarbonamides or corresponding mixed polyaddition products with viscosities of less than 2500 cps. at a resinous solids content of about 10% by weight.

The preparation of this type of product is predicated on the belief that, due to the different reactivity between the hydrogen atoms bonded to the nitrogen atoms and the polyisocyanate and the hydroxyl groups of the solvent and the polyisocyanate, a preferential reaction occurs between the hydrogen atoms bonded to the nitrogen atoms and the isocyanate groups with such a sharp differentiation that a stable dispersion of a polyurea or the like in the polyol solvent can be prepared without substantial reaction with the solvent with suitable stoichiometry.

The apparent need to resort to the use of water and/or particular mixing equipment, as well as probably the emphasis upon relatively high reaction temperatures, to prepare satisfactory products of this type is certainly an indication of the difficulties involved in stabilizing a product of this type. Stabilization is provided by the graft species resulting from the condensation reaction of a polyol molecule with a growing polymer chain. Stabilization of the system in this fashion can be problematic since, as has been previously noted, the reaction rate of the diisocyanate and the amine used will typically be orders of magnitude faster than the rat of reaction between an isocyanato radical and a hydroxyl group. This apparently results in a limitation as to the amount of polymer which may be used, and perhaps other process limitations, if a satisfactorily stable dispersion is to be obtained. Reischi, et al. and Konig, et al. recognize this problem, and accordingly suggest including emulsifying substances in the polyaddition reaction so that the stability of the dispersion will be increased. These emulsifying substances include linear polyethers having an average molecular weight of 300 to 4000 and carrying isocyanate groups or amino or hydrazide groups at both ends of the chain or preferably only at one end.

In the basic process described in these latter two patents, the need to use the processing aids identified seems to be tailored to a rather specific type of polymerization. More particularly, the utilization of relatively large amounts of water added to the polyol and the polyamine used should provide two phases, typically an emulsion of some sort. The use of the high performance flow mixer is apparently designed to provide water phase droplets of relatively small size to thus control the polymer particle size which is formed by polymerization of the polyisocyanate with the polyamine, followed by eventual phase separation to form the dispersion. The use of relatively high reaction temperatures is apparently intended to decrease the difference in reactivity with isocyanate radicals between the amino groups and the hydroxyl groups. Obtaining satisfactory dispersion stability must accordingly be predicated upon satisfactorily optimizing what comes down to an emulsion polymerization type of reaction, perhaps even involving interfacial polymerization.

OBJECTS OF THE INVENTION

It is therefore an object of this invention to provide stable dispersions of polyurea and the like in a polyol or combination of polyols.

It is a further object of this invention to provide dispersions of polyurea and the like in a polyol or combination of poyols wherein the solid polymer particles are sufficiently small to allow the dispersions to pass through a 150 mesh screen in 20 seconds or less.

It is a further object of this invention to provide dispersions of polyurea and the like in a polyol or combination of polyols wherein the solid polymer particles are sufficiently smaller to allow the dispersions to pass through a 700 mesh screen in 450 seconds or less.

Another object of the invention is to provide dispersions of polyurea and the like in a polyol or combination of polyols wherein phase separation is substantially inhibited.

It is also an object of this invention to provide polyurethane foams of reduced combustibility.

These and other benefits of the present invention will be apparent to those skilled in the art from the following description of the invention and Examples.

SUMMARY OF THE INVENTION

It has now been found that dispersions of increased stability are formed by polymerizing an amine and an isocyanate in the presence of an aminoalcohol, typically an aminopolyol, having the following formula:

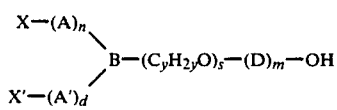

wherein A and A' are individually connective atoms which may be same or different, and are selected from the group consisting of carbon and oxygen or combinations thereof with hydrogen atoms or the like satisfying the valences; B is a member selected from the group consisting of nitrogen, NR, R being alkyl or aryl, or CR', R' being hydrogen, alkyl or aryl; D is a member selected from the group consisting of

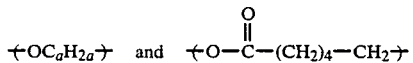

wherein a has a value of one to four; X is a member selected from the group consisting of OH, NH$_2$, or H; X' is a member selected from the group consisting of H or NHR' where R' is hydrogen, alkyl or aryl; n and d are individually integers of 0 to 10 and the sum of n and d is at least one and does not exceed 10; s is either 0 or 1; y is an integer of 0 to 4; and m is an integer of at least about 16, with the proviso that when B is nitrogen and either n or d is zero, X and X' are not both H.

Polyurethane foams of reduced combustibility can be formed from the dispersions of this invention.

DETAILED DESCRIPTION OF THE INVENTION

Dispersions of increased stability are formed in accordance with this invention by polymerizing an amine and an isocyanate in the presence of an aminoalcohol, typically an aminopolyol, having the following formula:

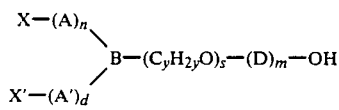

wherein A and A' are individually connective atoms which may be same or different, and are selected from the group consisting of carbon and oxygen or combinations thereof with hydrogen atoms or the like satisfying the valences; B is a member selected from the group consisting of nitrogen, NR, R being alkyl or aryl, or CR', R' being hydrogen, alkyl or aryl; D is member selected from the group consisting of

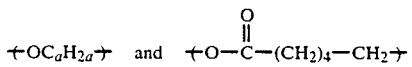

wherein a has a value of one to four; X is a member selected from the group consisting of OH, NH$_2$ or H; X' is a member selected from the group consisting of H or NHR' where R' is hydrogen, alkyl or aryl; n and d are individually integers of 0 to 10 and the sum of n and d is at least one does not exceed 10; s is either 0 or 1; y is an integer of 0 to 4; and m is an integer of at least about 16, with the proviso that when B is nitrogen and either n or d is zero, X and X' are not both H.

Preferred aminopolyols include those wherein X'=R'NH and those wherein d=o, B=N and X'=H; i.e., those having one of the following two formulae:

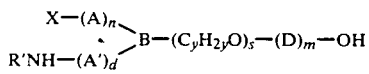

and

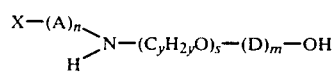

As may be appreciated, the selection of R' may well affect the relative reactivity of the R'HN functional group. Also, it will be generally desirable to utilize species in which X is OH, although this is not believed to be essential.

Synthetic routes to provide these aminoalcohols are known. See, for example, U.S. Pat. No. 4,581,470 to Hoy, et al. The stabilizers will generally have a molecular weight ranging from 500 grams per mole to 5000 grams per mole and provide processing advantages comparable to low molecular weight extenders such as ethylene glycol.

It has been found that the use of such aminopolyols provided enhanced dispersion stability and generally provide lower viscosities as well. Visual inspection of the dispersion to detect phase separation is one means for determining whether the dispersion is stable. Another means for determining stability is measuring the particle size of the solid component of the dispersion. Preferably, the dispersions produced in accordance with this invention have a solid component particle size sufficiently small to allow the dispersions to pass through a 150 mesh (100 micron) screen in 20 seconds or less. More preferably, the particle size of the solids is such that the dispersions will pass through a 700 mesh (17.9 micron) screen in 450 seconds or less. Other particle sizes for the solids in the dispersion may, of course, be satisfactory depending on the use to be made of the dispersion.

The aminopolyols utilized in this invention possess functional groups that will be capable of chemical reaction with the diisocyanate employed in the polyurethane reaction in which the polyurea dispersions of this invention may be used to enhance the resulting modulus.

Any known method for preparing dispersions of polyurea and the like in polyols which involve solution polymerization can be used to produce dispersions in accordance with this invention. Such methods of preparation include batch processes as well as continuous processes.

Generally, the amount of aminopolyol utilized in the preparation of the dispersions of this invention will range from 0.5% to 25% based on the weight of the base polyol. It should be understood, however, that the exact amount of stabilizer utilized will depend on the reactivity and molecular weight of the particular stabilizer chosen. In general, lower amounts of stabilizer will be required to be added to the polymerization solution for stabilizers having relatively high reactivity or high molecular weight. The determination of the reactivity and molecular weight of a given stabilizer is within the purview of one skilled in the art.

Polyisocyanates, polyamines and polyols which may be employed to form the polyurea dispersions in polyols described herein include those identified in U.S. Pat. Nos. 3,325,421; 4,089,835 and 4,093,569. The polyamines that may be employed thus, in general, include the divalent and/or higher polyvalent primary or secondary amines identified in these patents. Hydrazines and hydrazides identified in these patents may likewise be employed and, as used herein, the term polyamines is intended to include the hydrazines and hydrazides. The term polyureas as used herein, is intended to include polyhydrazo-dicarbonamides or other mixed polyaddition products formed from the polyisocyanates and the polyamines or the like used. Similarly, suitable isocyanates are described in such patents.

The molecular weight of the polyurea and, to some extent, viscosity of the resulting dispersion will be determined by the quantitative ratio between the polyamine and the polyisocyanate. In general, the NCO—NH ratio may vary from about 0.80 to 1.05.

The particular polyamines and polyisocyanates will be generally selected on the basis of availability (cost) and the properties desired for the particular application. For example, where the application involves combustibility standards, it will generally be desirable to select these components such that the resulting polyurea will decompose at a temperature in the range of about 200° to 400° C., so as to provide the melt flow characteristics desired for satisfactory performance in the standard combustibility or burn test.

The polyamine employed must be capable of providing a single phase when added to the base polyol used as the polymerization medium. The base polyol will be typically selected by the hydroxyl number and functionality desired for the particular application. Suitable polyols are described in the previously identified patents and, where the polyurea dispersions are to be used in polyurethane foam preparation, the base polyol will typically have a hydroxyl number in the range of from about 25 to about 150.

If the polyaming or polyamines used do not form a single phase in the base polyol selected in the amount needed to provide the desired solids content, as is the case with piperazine, the polyamine may be solubilized by any solvent which allows a polyamine-solvent-base polyol single phase to be prepared. It has accordingly been found suitable to utilize a relatively low molecular weight alcohol, desirably a secondary alcohol such as isopropanol, so as to minimize the reactivity of the solvent with the polyisocyanate being used.

It has been found that stable polyurea dispersions in polyols of relatively high solids contents (up to 50%) may be prepared by using low reaction temperatures, i.e., less than about 30° C. or so. Higher reaction temperatures could be utilized, but are not required to provide dispersion stability.

In accordance with yet another aspect of this invention, solution polymerization may be readily adjusted to provide even further dispersion stability by selecting polyamines and polyisocyanates such that the resulting polyurea will have an appropriate cohesive energy density relative to the base polyol (and, when used, the solvent for the polyamine) being used. More particularly, if the difference in the cohesive energy density is too great, the growing polyurea chain will phase separate too soon, generally providing high viscosity and fine particles that may undesirably agglomerate. On the other hand, if the difference in the cohesive energy density is too low, the growing polyurea chain will not phase separate until too late in time, generally providing large particles that may tend to settle out.

In either event, satisfactory dispersion stability can be imparted by incorporation of a further polyamine, another polyisocyanate, or both so that the proper cohesive energy density differential is provided. This will generally mean that either or both of the polyamine and polyisocyanate components will be present as mixtures of two or more materials. However, if the original components are considered unnecessary, they may be replaced by materials that will provide an appropriate cohesive energy differential between the polyurea being formed and the base polyol.

Cohesive energy densities are known for many materials and can be related to the chemical potential ($\Delta M$) which predicts the phase behavior of the system. The chemical potential may be approximated by employing the following formula:

$$\Delta M = 2 RT - \frac{V_s + V_p}{2} (\delta_s - \delta_p)^2 x^2$$

wherein R is the universal gas constant; T is temperature in degrees Kelvin; $V_s$ and $V_p$ are the molar volumes of the polyol (and solvent if used) and the polyurea respectivel $\delta_s$ and $\delta_p$ are the solubility parameters of the polyol (and solvent if used) and the polyurea respectively (and are likewise the square root of the respective cohesive energy density); and x is the volume fraction concentration of the polyureas present. This equation can be deduced from the theory of solubility as presented in *The Solubility of Non-Electrolytes*, by J. H. Hildebrand and R. L. Scott at page 253, published by Dover Publications, Inc., New York, N.Y. (1964). The more negative the value of $\Delta M$, the stronger the propensity will be to phase separate. The molar volume and solubility contributions are readily estimated from their structure, using methods well described in the literature, as in the "New Values of the Solubility Parameter From Vapor Pressure Data", by K. L. Hoy, *Journal of Paint Technology*, Volume 482, 116 (1970); "Solubility Parameters For Film Formers", by H. Budell, *Official Digest*, 726 (1955); "Molar Volume Additivity Polymers", by R. Kawai, *Chemistry of High Polymers*, (Japan), Volume 13, Pages 139–147 (1956); and Properties of Polymers, by D. W. Van Krevelan Elsivier/North-Holland, Inc., New York, N.Y., Chapter 7, 129 (1976).

As an illustrative example, when the base polyol is a glycerol-started poly(oxypropylene) polyol having about 10 weight percent internal ethylene oxide content, a nominal functionality of 3 and a nominal hydroxyl number of 52, a satisfactory polyurea dispersion can be formed using piperazine and toluene diisocyanate (TDI). However, significant improvement in the dispersion stability and viscosity characteristics can be provided by incorporating either a minor amount (e.g., 10 mole % based on the TDI present) of isophorine diisocyanate (IPDI) or by adding with the piperazine a minor amount (e.g., 10 mole percent based upon the total moles of the amine mixture) of aminoethylpiperazine.

The following EXAMPLES are illustrative of, but not in limitation of, the present invention. Example 1 is illustrative of a method for preparing aminopolyols useful in this invention. EXAMPLES 2–15 describe the preparation of dispersions in accordance with this invention using a batch process. EXAMPLES 16–25 describe the preparation of dispersions in accordance with this invention using a continuous process.

DEFINITIONS

In the Examples which follow:

Polyol A denotes a product made by reacting propylene oxide, ethylene oxide, 10 wt. %, and propylene oxide successively with qlycerol in the presence of potassium hydroxide as catalyst and refining to remove the catalyst. The product contains a nominal 10 wt. % internal ethylene oxide and has a nominal hydroxyl number of 52;

Polyol B denotes a product made by mixing nine parts of Polyol A and one part of a product made by reacting propylene oxide and ethylene oxide successively with glycerol in the presence of potassium hydroxide catalyst and refining to remove the catalyst to yield a product containing 15 weight percent ethylene oxide and has a nominal hydroxyl number 35.5;

Polyol C denotes a propylene oxide adduct of trimethylolpropane terminated with secondary hydroxyl groups having equivalent weight of 5600;

TDI is toluene diisocyanate;
IPDI is isophorine diisocyanate;
PAPI is a polymethylene polyphenylisocyanate commercially available;
AEP is aminoethyl piperazine;
The amino catalyst used was a mixture of 70% bis(-dimethylaminethyl) ether in dipropylene glycol, 33% triethylene diamine in dipropylene glycol and diethanol amine;
The silicone surfactant used was a polysiloxane polyether block copolymer commercially available; and
The tin catalyst used was dibutylin dilaurate.

EXAMPLE 1

This Example illustrates the preparation of an aminopolyol suitable for use as a stabilizer in the present invention.

To a three neck, round bottom flask, 315 grams of diethanolamine, 335 grams of toluene and 216 grams of isobutylaldehyde were added and heated to about 110° C. Water was azeotroped off and the remaining toluene, 312 grams, removed under vacuum. The product, 2-isopropyloxazoline-ethanol, was distilled, thereby producing 370% grams of reaction product.

Using known alkoxylation preparation techniques, 1000 grams of propylene oxide was added to 100 grams of the above reaction product in the presence of 3 grams potassium hydroxide as catalyst. The product was hydrolyzed with 500 grams of water at about 100° C. The isobutylaldehyde was removed by distillation. The resulting aminopolyol product was neutralized with a synthetic magnesium silicate commercially available under the name "Magnasol" and filtered through a bed of "Hi-Flow" to obtain pure polyol product. The polyol had a nominal hydroxyl number of 82.0 and molecular weight of 1850 grams/mole.

EXAMPLES 2-14

These Examples illustrates the preparation of polyurea dispersions in accordance with this invention.

A one liter, 4 neck, reactor flask equipped with a mechanical stirrer, cooling bath, thermometer, dropping funnel and a nitrogen sparge was charged with polyol of Example 1 as a stabilizer. The nature of and the amount of the reactants used in Examples 2-14 are set forth in Table I. The mixture was stirred for from 15 to 30 minutes at 30° C. The isocyanate or blend of isocyanates as noted in Table I was added over a 1 to 2 hour period. The reaction temperature was maintained below about 35° C. during the isocyanate addition. The reactor contents were held at less than 35° C. for about one hour with stirring after the isocyanate had been charged.

The product was stripped on a roto-vap at reduced pressure, 0.2 mm Hg, for one hour at 70° C., and allowed to cool overnight. Optionally, additional polyol was added to adjust the polymer (solid) content to 20 wt. %.

As used in Example 2-14, Polyol A denotes a product made by reacting propylene oxide, ethylene oxide, 10 wt. %, and propylene oxide successively with glycerol in the presence of potassium hydroxide as catalyst and refining to remove the catalyst. The product contains a nominal 10 wt. % internal ethylene oxide and has a nominal hydroxyl number of 52.

Polyol B denotes a product made by mixing nine parts of Polyol A and one part of a product made by reacting propylene oxide and ethylene oxide successively with glycerol in the presence of potassium hydroxide catalyst and refining to remove catalyst to yield a product containing 15 weight percent ethylene oxide and has a nominal hydroxyl number of 35.5.

The reactants used to prepare the polyurea in polyol dispersions, the amounts thereof used, and the preparation of the resulting dispersions are set forth in Table I.

TABLE I

| Example No. Formulation | 2 | 3 | 4 | 5 | 6 | 7 | 8 | 9 | 10 | 11 | 12 | 13 | 14 |
|---|---|---|---|---|---|---|---|---|---|---|---|---|---|
| Polyols, (gms.) | | | | | | | | | | | | | |
| A | 200 | 250 | 250 | 250 | 250 | 200 | 200 | 200 | 200 | 250 | 1000 | 250 | 500 |
| B | — | — | — | — | — | 50 | 50 | 50 | 50 | — | — | — | — |
| Stabilizer (gms.) | | | | | | | | | | | | | |
| Example 1 | 50 | 10' | 10 | 10 | 5 | 13 | 13 | 13 | 13 | 10 | 40 | 10 | 0 |
| Isocyanates (gms.) | | | | | | | | | | | | | |
| TDI | 57 | 52 | 52 | — | 52 | 50 | 50 | 54 | 54 | 61.5 | 252 | 68 | 114 |
| IPDI | — | — | — | 63 | — | 16 | — | 16 | 16 | — | — | — | — |
| HMDI | — | — | — | — | — | — | 16 | — | — | 6 | 26 | — | — |
| Amines (gms.) | | | | | | | | | | | | | |
| Piperazine | 26 | 25 | 25 | 25 | 25 | 33 | 33[2] | 33 | 33[2] | 33 | 130 | 30 | 43 |
| AEP | — | — | — | — | — | — | — | — | — | — | — | 5 | — |
| Physical Properties | | | | | | | | | | | | | |
| Solids, wt. % | 40 | 26 | 26 | 28 | 25 | 30 | 30 | 32 | 32 | 31 | 32 | 30 | 23 |
| Viscosity, (× 1000), cps | | | | | | | | | | | | | |
| 30 wt. % | >50 | — | — | — | — | 20 | 31 | 22 | 20.5 | 21 | 20 | 10.8 | — |
| 20 wt. % | >30 | 20 | 46.4 | 8 | 20.2 | 3.8 | 3.8 | 4.7 | 3.5 | 4.3 | 3.8 | 3.8 | >60 |
| OH # (nominal) | 31.2 | 38.4 | 38.4 | 37.4 | 39.0 | 34.9 | 34.9 | 33.9 | 39.8 | 35.9 | 36.4 | 37.4 | 40.0 |
| Appearance[4] | TW | TW | TW | TW | TW | SW | SW | SW | SW | SW | SW | SW | TW |

1. Molecular weight of ~3700 grams/mole of an Amino polyol stabilizer
2. 40% aqueous solution of piperazine
3. AEP = aminoethylpiperazine
4. TW = thick consistency white material
   SW = smooth consistency white material

EXAMPLES 15A AND 15B

Foams can be produced from the dispersions of this invention by techniques known to those skilled in the art. Example 15A illustrates the preparation of free rise slab stock foam using a 50/50 blend of Polyol A and the polyurea dispersion in polyol of Example 12 in a standard, unoptimized foam formulation. For comparative purposes, in Example 15B a free rise foam was made from Polyol A. The processing conditions used in preparing the foams and the physical properties of the foams are set forth in Table II.

TABLE II

| Example No. | 15A | 15B |
|---|---|---|
| Process Conditions | | |
| Polyol | Example 12 | Polyol A |
| NCO | 100 | 100 |
| Water | 3.5 | 3.5 |
| Amino Catalyst | 0.15 | 0.15 |
| Silicone Surfactant | 1.0 | 1.0 |
| Tin Catalyst | 0.20 | 0.25 |
| TDI | 40.87 | 41.70 |
| Polyol Temperature, °F. | 75 | 75 |
| Cream Time, seconds | 12 | 11 |
| Rise Time, seconds | 105 | 106 |
| Gel Time, seconds | 125 | 120 |
| Setting Time | nil | nil |
| Cure | good | good |
| Foam Properties | | |
| Density, lb/ft | 1.66 | 1.61 |
| Porosity, ft$^3$/min/ft$^2$ | 26 | 58 |
| IFD, lb/50 ft | | |
| 25% | 29.5 | |
| 50% | 59.9 | 45.9 |
| Tensile Strength, lb/in$^2$ | 12.0 | 16.0 |
| Elongation, % | 152 | 305 |
| Tear Resistance, lb/in | 1.7 | 2.6 |
| Burn, in. | 2.0 | complete* |

*Burn rate equals 4 inches per minute.

It can be seen from Examples 15A and 15B that the dispersions of this invention can have superior combustibility characteristics compared to conventional foams prepared without stabilizers. Thus, the foam of Examples 15A prepared from a polyurea dispersion with a base polyol having a high nominal hydroxyl number using an aminopolyol as a stabilizer was white and scorch-free and had a total burn length less than the 3.5 required by MVSS-302 in order to get an SE-NBR rating. The foam of Example 15B, prepared with no aminopolyol stabilizer, on the other hand, burned completely.

EXAMPLES 16-22

In Examples 16-22, polyol C is propylene oxide adduct of trimethylolpropane terminated with secondary hydroxyl groups having equivalent weight of 5600.

The aminopolyol stabilizer used in Examples 16-22 is a propylene oxide, ethylene oxide adduct of propylene glycol having an ethylene oxide content of 5 weight percent and an equivalent weight of 2800. This stabilizer has the formula:

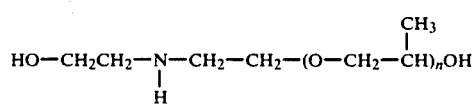

The following procedure was used to prepare the dispersions of Examples 16-22: A 350 mill-liter reactor, equipped with a stirrer, thermocouple, water-cooled jacket and 3 precision laboratory pumps for metering the mixture of polyol C and the aminopolyol stabilizer (feed 1), the mixture of polyol C, amines and organic solvents (feed 2) and the mixture of diisocyanates and organic solvent (feed 3). The exact compositions of feeds 1, 2 and 3 are given in Table III. After flushing the reactor well with nitrogen, feeds 1, 2 and 3 were steadily and continuously added into the reactor at a flow rate of 668 grams per hour. The reaction mixture was well stirred at about 1000 RPM and maintained at 5-8 psig and 25-29° C. The 200 grams of product was diluted by 100 grams of isopropanol to conduct filtration hindrance tests using 150 and 700 MESH screens. All the organic solvents were stripped out and then a Brookfield viscosity was measured at room temperature (22° C.). Viscosities and the results of the filtration hindrance tests are also reported in TABLE III.

TABLE III

| | Example | | | | | | |
|---|---|---|---|---|---|---|---|
| | 16 | 17 | 18 | 19 | 20 | 21 | 22 |
| Feed 1 (%) | | | | | | | |
| Polyol C | 86.2 | 86.2 | 86.2 | 86.2 | 86.2 | 86.2 | 86.2 |
| Stabilizer | 13.8 | 13.8 | 13.8 | 13.8 | 13.8 | 13.8 | 13.8 |
| Feed 2 (%) | | | | | | | |
| Polyol C | 53.8 | 53.8 | 53.8 | 53.8 | 53.8 | 53.8 | 53.8 |
| Piperazine | | 7.2 | | 7.2 | | 7.8 | |
| Isopropanol | | 38.0 | | 38.0 | 42.3 | 38.0 | 37.2 |
| Toluene | 35.6 | | 38.8 | | | | |
| Aminoethyl Piperazine | 10.6 | | | | | | |
| Ethylene Diamine | | 1.0 | | | | | |
| Diamino Propane | | | | 7.4 | | | |
| 85% Hydrazine | | | 1.0 | | | | |
| Anhydrous Hydrazine | | | | | 3.9 | | |
| Diethyl Triamine | | | | | | 0.4 | |
| Triethanol Amine | | | | | | | 9.0 |
| Feed 3 (%) | | | | | | | |
| TDI | 15.1 | 17.5 | 18.3 | 17.5 | 21.8 | 17.5 | 16.7 |
| Toluene | 84.9 | 82.5 | 81.7 | 82.5 | 78.2 | 82.5 | 83.3 |
| Time (in seconds) to pass through: | | | | | | | |
| 150 mesh | 15 | 18 | 17 | 15 | 17 | 18 | 15 |
| 700 mesh | 120 | 210 | 170 | 115 | 155 | 430 | 110 |
| Viscosity (cps) | 48,600 | 3,920 | 176,800 | 5,200 | 91,600 | 43,600 | 4,960 |

EXAMPLES 23 AND 24

Examples 23 and 24 are additional specific examples of dispersions prepared in accordance with this invention. The method of preparation was that described above with regard to Examples 16-22. The exact formulations and results of filtration hindrance tests as well as viscosity measurements are reported in Table IV.

TABLE IV

| Feed 1 (%) | 23 | 24 |
|---|---|---|
| Polyol C | 86.1 | 86.1 |
| Aminopolyol Stabilizer | 13.9 | 13.9 |
| Feed 2 (%) | | |
| Polyol C | 53.9 | 53.9 |
| Piperazine | 8.4 | 8.4 |
| Isopropanol | 37.7 | 37.7 |
| Feed 3 (%) | | |
| TDI | 17.1 | 17.2 |
| Toluene | 81.9 | 81.8 |
| IDPI | 1.0 | |

TABLE IV-continued

| Feed 1 (%) | 23 | 24 |
|---|---|---|
| PAPI | | 1.0 |
| Time (in seconds) to pass through: | | |
| 150 mesh | 16 | 19 |
| 700 mesh | 180 | 240 |
| Viscosity (cps at 25° C.) | 43,200 | 40,000 |

EXAMPLES 25-28

EXAMPLES 25 through 28 are additional specific examples of dispersions prepared in accordance with this invention. The method of preparation was that described above with regard to Examples 16-22. The exact formulations and results of filtration hindrance tests as well as viscosity measurements are reported in Table V.

TABLE V

| Feed 1 (%) | 25 | 26 | 27 | 28 |
|---|---|---|---|---|
| Polyol C | 86.2 | 86.2 | 86.2 | 96.4 |
| Aminopolyol Stabilizer | 13.8 | 13.8 | 13.8 | 3.6 |
| Feed 2 (%) | | | | |
| Polyol C | 53.8 | 53.8 | 53.8 | 43.6 |
| Piperazine | 7.4 | 7.4 | 7.4 | 11.0 |
| Isopropanol | 19.0 | 38.0 | 15.9 | 22.2 |
| Toluene | 19.0 | | | |
| 2,5-dichlorophenyl hydrazine | 0.8 | | | |
| Piperazine phosphate | | 0.8 | 0.8 | |
| Methanol | | | 22.1 | |
| 2,5-dichlo-1,4 phenyldiamine | | | | 1.0 |
| Methyl Ethyl Ketone | | | | 22.2 |
| Feed 3 (%) | | | | |
| TDI | 17.5 | 17.5 | 17.5 | 23.8 |
| Toluene | 82.5 | 82.5 | 82.5 | 75.2 |
| IPDI | | | | 1.0 |
| Time (in seconds) to pass through: | | | | |
| 150 mesh | 16 | 16 | 17 | 18 |
| 700 mesh | 130 | 160 | 130 | 135 |
| Viscosity (cps) | 26,400 | 27,800 | 9,120 | 332,000 |

Although particular illustrative embodiments of the present invention have been described herein, the present invention is not limited to these particular embodiments. Various changes and modifications may be made thereto by those skilled in the art without departing from the spirit or scope of the invention, which is defined by the appended claims.

We claim:

1. In a method of preparing a dispersion of a polymer in a polyol or combination of polyols which includes solution copolymerizing an amine and an isocyanate in a polyol or combination of polyols the improvement which comprises copolymerizing in the presence of a sufficient amount of a compound having the formula:

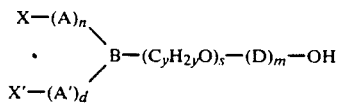

wherein A and A' are individually connective atoms which may be same or different, and are selected from the group consisting of carbon and oxygen or combinations thereof with hydrogen atoms or the like satisfying the valences; B is a member selected from the group consisting of nitrogen, NR, R being alkyl or aryl, or CR', R' being hydrogen, alkyl or aryl; D is a member selected from the group consisting of

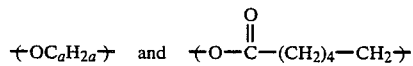

wherein a has a value of one to four; X is a member selected from the group consisting of OH, $NH_2$, or H; X' is a member selected from the group consisting of H or NHR' where R' is hydrogen, alkyl or aryl; n and d are individually integers of 0 to 10 and the sum of n and d is at least one and does not exceed 10; s is either 0 or 1; y is an integer of 0 to 4; and m is an integer of at least about 16, with the proviso that when B is nitrogen and either n or d is zero, X and X' are not both H; said compound being present in an amount sufficient to reduce the size of the solid polymer particles whereby phase separation is substantially inhibited and a stable dispersion is produced.

2. The method of claim 1 wherein said compound is present in an amount sufficient to reduce the particle size of the solid polymer particles such that the dispersion passes through a 150 mesh screen in 20 seconds or less.

3. The method of claim 1 wherein said compound is present in an amount sufficient to reduce the particle size of the solid polymer particles such that the dispersion passes through a 700 mesh screen in 450 seconds or less.

4. The method of claim 1 wherein said stabilizer is provided in an amount from 0.5% to 25% based on the weight of the polyol.

5. A method of preparing a dispersion of a polymer in a polyol or combination of polyols, the method comprising copolymerizing an amine and an isocyanate in a polyol or combination of polyols in the presence of a sufficient amount of a compound having the formula:

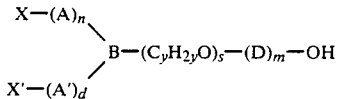

wherein A and A' are individually connective atoms which may be same or different, and are selected from the group consisting of carbon and oxygen or combinations thereof with hydrogen atoms or the like satisfying the valences; B is a member selected from the group consisting of nitrogen, NR, R being alkyl or aryl, or CR', R' being hydrogen, alkyl or aryl; D is a member selected from the group consisting of

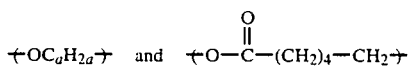

wherein a has a value of one to four; X is a member selected from the group consisting of OH, $NH_2$ or H; X' is a member selected from the group consisting of H or NHR' where R' is hydrogen, alkyl or aryl; n and d are individually integers of 0 to 10 and the sum of n and d is at least one and does not exceed 10; s is either 0 or 1; y is an integer of 0 to 4; and m is an integer of at least about 16, with the proviso that when B is nitrogen and either n or d is zero, X and X' are not both H; said compound being present in an amount sufficient to reduce the size of the solid polymer particles whereby phase separation is substantially inhibited and a stable dispersion is produced.

6. The method of claim 5 wherein said compound is present in an amount sufficient to reduce the particle size of the solid polymer particles such that the dispersion passes through a 150 mesh screen in 20 seconds or less.

7. The method of claim 5 wherein said compound is present in an amount sufficient to reduce the particle size of the solid polymer particles such that the dispersion passes through a 700 mesh screen in 450 seconds or less.

8. The method of claim 5 wherein said compound is present in an amount from 0.5% to 25% based on the weight of the polyol.

9. In a dispersion composition containing a polymer dispersed in a polyol or combination of polyols, the improvement which comprises:

said polymer comprising an amine and an isocyanate which are copolymerized in the presence of a sufficient amount of a compound having the formula:

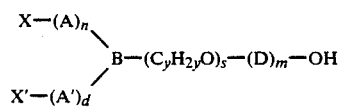

wherein A and A' are individually connective atoms which may be same or different, and are selected from the group consisting of carbon and oxygen or combinations thereof with hydrogen atoms or the like satisfying the valences; B is a member selected from the group consisting of nitrogen, NR, R being alkyl or aryl, or CR', R' being hydrogen, alkyl or aryl; D is a member selected from the group consisting of

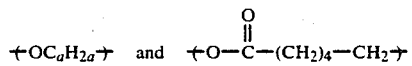

wherein a has a value of one to four; X is a member selected from the group consisting of OH, NH$_2$, or H; X' is a member selected from the group consisting of H or NHR' where R' is hydrogen, alkyl or aryl; n and d are individually integers of 0 to 10 and the sum of n and d is at least one and does not exceed 10: s is either 0 or 1; y is an integer of 0 to 4; and m is an integer of at least about 16, with the proviso that when B is nitrogen and either n or d is zero, X and X' are not both H; said compound being present in an amount sufficient to reduce the size of the solid polymer particles whereby phase separation is substantially inhibited and a stable dispersion is produced.

10. The method of claim 9 wherein said compound is present in an amount sufficient to reduce the particle size of the solid polymer particles such that the dispersion passes through a 150 mesh screen in 20 seconds or less.

11. The method of claim 9 wherein said compound is present in an amount sufficient to reduce the particle size of the solid polymer particles such that the dispersion passes through a 700 mesh screen in 450 seconds or less.

12. The method of claim 9 wherein said stabilizer is provided in an amount from 0.5% to 25% based on the weight of the polyol.

13. A dispersion composition comprising a polymer dispersed in a polyol or combination of polyols, said polymer comprising an amine and an isocyanate which are copolymerized in the presence of a sufficient amount of a compound having the formula:

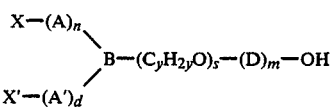

wherein A and A' are individually connective atoms which may be same or different, and are selected from the group consisting of carbon and oxygen or combinations thereof with hydrogen atoms or the like satisfying the valences; B is a member selected from the group consisting of nitrogen, NR, R being alkyl or aryl, or CR', R' being hydrogen, alkyl or aryl; D is a member selected from the group consisting of

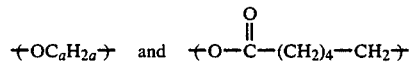

wherein a has a value of one to four; X is a member selected from the group consisting of OH, NH$_2$ or H; X' is a member selected from the group consisting of H or NHR' where R' is hydrogen, alkyl or aryl; n and d are individually integers of 0 to 10 and the sum of n and d is at least one and does not exceed 10; s is either 0 or 1; y is an integer of 0 to 4; and m is an integer of at least about 16, with the proviso that when B is nitrogen and either n or d is zero, X and X' are not both H; said compound being present in an amount sufficient to reduce the size of the solid polymer particles whereby phase separation is substantially inhibited and a stable dispersion is produced.

14. The method of claim 13 wherein said compound is present in an amount sufficient to reduce the particle size of the solid polymer particles such that the dispersion passes through a mesh screen in 20 seconds or less.

15. The method of claim 13 wherein said compound is present in an amount sufficient to reduce the particle size of the solid polymer particles such that the dispersion passes through a mesh screen in 450 seconds or less.

16. The method of claim 13 wherein said stabilizer is provided in an amount from 0.5% to 25% based on the weight of the polyol.

17. A polyurethane foam characterized by reduced combustibility made using the dispersion composition of claim 9.

18. A polyurethane foam characterized by reduced combustibility made using the dispersion composition of claim 13.

* * * * *